(12) United States Patent
Gmirya

(10) Patent No.: US 8,683,892 B2
(45) Date of Patent: *Apr. 1, 2014

(54) SPLIT-TORQUE GEAR BOX

(71) Applicant: Sikorsky Aircraft Corporation, Stratford, CT (US)

(72) Inventor: Yuriy Gmirya, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/772,630

(22) Filed: Feb. 21, 2013

(65) Prior Publication Data

US 2013/0160605 A1  Jun. 27, 2013

Related U.S. Application Data

(60) Division of application No. 13/210,825, filed on Aug. 16, 2011, now Pat. No. 8,397,603, which is a continuation of application No. 10/621,129, filed on Jul. 16, 2003, now Pat. No. 8,015,900.

(51) Int. Cl.
*F16H 1/22* (2006.01)
*B60K 17/24* (2006.01)
*B60K 17/28* (2006.01)

(52) U.S. Cl.
USPC ............ 74/665 GA; 74/409; 74/413

(58) Field of Classification Search
USPC ........ 74/424.5, 397, 401, 409, 413, 412, 411, 74/406, 665 GA, 665 B
See application file for complete search history.

(56) References Cited

U.S. PATENT DOCUMENTS

| 106,360 A | 8/1870 | Hamlin |
| 2,823,558 A | 2/1958 | Semar et al. |
| 3,456,520 A | 7/1969 | Fritsch |
| 3,678,775 A | 7/1972 | Danielsson |
| 3,772,934 A | 11/1973 | Warren |
| 3,905,250 A | 9/1975 | Sigg |
| 3,969,956 A | 7/1976 | Hanslik |
| 4,022,083 A | 5/1977 | Pollak-Banda et al. |
| 4,297,907 A | 11/1981 | Bossler, Jr. et al. |
| 4,484,491 A | 11/1984 | Cocking |
| 4,489,625 A | 12/1984 | White |
| 4,682,512 A | 7/1987 | Peterson |
| 4,912,999 A | 4/1990 | Franks et al. |
| 4,928,490 A | 5/1990 | Papastavros |
| 4,973,221 A | 11/1990 | Anderson et al. |
| 5,085,315 A | 2/1992 | Sambell |

(Continued)

FOREIGN PATENT DOCUMENTS

| GB | 2130682 | 6/1984 |
| GB | 2158895 | 11/1985 |
| WO | 0198100 | 12/2001 |

*Primary Examiner* — Roger Pang
(74) *Attorney, Agent, or Firm* — Carlson, Gaskey & Olds P.C.

(57) ABSTRACT

A split torque gearbox system provides a multiple path, three stage power gear train that transmits torque from a high-speed engine to a low speed output shaft, while providing equal gear load distribution with a floating pinion in the second stage of reduction. The number of the split modules in the gearbox depends on gearbox configuration, number of high speed input shafts, and transmitted power. The split modules are located around a last stage output gear that combines power from each module and transmits the power to an output such as a main rotor system.

4 Claims, 10 Drawing Sheets

(56) References Cited

U.S. PATENT DOCUMENTS

| | | |
|---|---|---|
| 5,113,713 A | 5/1992 | Isabelle et al. |
| 5,129,276 A | 7/1992 | Fahy et al. |
| 5,233,886 A | 8/1993 | Bossler, Jr. |
| 5,509,862 A | 4/1996 | Sherman |
| 5,528,960 A | 6/1996 | Nagao et al. |
| 5,572,910 A | 11/1996 | Tomaselli et al. |
| 5,802,918 A | 9/1998 | Chen et al. |
| 5,813,292 A | 9/1998 | Kish et al. |
| 5,820,345 A | 10/1998 | Giffin, III et al. |
| 5,823,470 A | 10/1998 | Craig et al. |
| 5,974,911 A | 11/1999 | Pias et al. |
| 6,035,956 A | 3/2000 | Maurer et al. |
| 6,041,670 A | 3/2000 | Basstein |
| 6,183,388 B1 | 2/2001 | Hawkins |
| 6,244,175 B1 | 6/2001 | Lin et al. |
| 6,260,430 B1 | 7/2001 | Andrei |
| 6,276,633 B1 | 8/2001 | Balayn et al. |
| 6,364,611 B1 | 4/2002 | Matsuda et al. |
| 6,746,356 B2 | 6/2004 | Pengilly |
| 6,761,082 B2 | 7/2004 | Hulshof |
| 6,855,087 B2 | 2/2005 | Chakraborty |
| 6,883,750 B2 | 4/2005 | Gmirya |
| 8,015,900 B2 | 9/2011 | Gmirya |
| 8,397,603 B2 * | 3/2013 | Gmirya .................. 74/665 GA |
| 2004/0237684 A1 | 12/2004 | Bossler |
| 2011/0194935 A1 * | 8/2011 | Garcia ........................ 416/120 |

* cited by examiner

SPLIT-TORQUE GEAR BOX

RELATED APPLICATIONS

This application is a divisional of U.S. application Ser. No. 13/210,825, filed 16 Aug. 2011. U.S. application Ser. No. 13/210,825 is a continuation of U.S. application Ser. No. 10/621,129, filed 16 Jul. 2003.

BACKGROUND

The present invention relates to a split torque gearbox, and more particularly to a rotary wing aircraft gearbox system.

A gearbox system of a rotorcraft or propeller-driven aircraft transfers power from a turbine engine to the rotor or propeller of the rotorcraft or aircraft. A typical system may direct power from several turbine engines to a single rotor or propeller. Since the rotational velocity of the rotor or propeller is significantly lower than the rotational velocity of the turbine engines, the turbine engine rotational velocity must be reduced by the gearbox system. In reducing the rotational velocity of the turbine engine output, torque is increased through a series of intermediate gear stages and shafts, before the final output drive is provided to the rotor. Relatively large gears are required near the final output drive to handle the high torque supplied to the rotors.

One prior art system includes a number of gears arranged for providing split-torque paths. The torque normally carried by a single drive train path is carried by two drive train paths to thereby split the torque of the original drive train path. The combined weight of these two split-torque paths is significantly less than the weight of the original single drive train path. While this prior art split torque system has managed to increase the horsepower-to-weight ratio in some situations, especially where total horsepower involved is substantial and where multiple input drive paths from different engines are present, this conventional approach still requires a relatively large weight and a relatively large volume.

Moreover, many conventional and split-torque gearbox systems are somewhat heavy and voluminous due to unequal load sharing. Unequal load sharing typically results when the transmission may not consistently split the load. This requires each gear to be sized to a dimension larger than optimal so as to assure adequate load capability even when the load is not consistently split. Furthermore, typical gearbox systems provide a single load path in which significant damage to a single gear may result in the disablement of the entire system.

Accordingly, it is desirable to provide a split torque gearbox system that is relatively uncomplicated and inexpensive to manufacture, has a reduced weight, and packaging size, assures an even split of loads, and generates independent redundant load paths.

SUMMARY

The split torque gearbox system according to the present invention provides a multiple path, three stages power gear train module that transmits torque from a high-speed engine to a low speed output shaft, providing equal gear load distribution due to floating pinion in the second stage of reduction.

Each split torque module is driven by a high-speed input shaft. The input shaft engages a face gear which provides the first stage The face gear, through a pinion shaft, drives a floating pinion. The pinion shaft provides a flexibility which defines a floating pinion displacement envelope. At the second stage, the floating pinion engages a first spur gear and a second spur gear. The floating pinion axis of rotation is displaceable within the displacement envelope such that the load of the floating pinion is effectively split between the first spur gear and the second spur gear. The first spur gear and the second spur gear thereby receive an equal amount of torque.

A first double helical gear is driven by the first spur gear about the first spur gear axis of rotation. A second double helical gear is driven by the second spur gear about the second spur gear axis of rotation. The first and second double helical gears are axially displaceable such that engagement between the first and second double helical gears and an output gear provides effective load sharing and center seeking capability. That is, in order to provide a load sharing the double helical pinion moves vertically to provide instant contact with upper and lower helical mesh of the double helical output gear. As the two spur gears are engaged with the floating pinion, which is movable within floating pinion displacement envelope, the center of the pinion will travel to balance the loads coming from both gear meshes.

The number of the split modules in the gearbox depends on vehicle configuration, number of engines and transmitted power. The modules are located around the last stage output gear that combines power from each one and transmits it to the main rotor.

The present invention therefore provides a split torque gearbox system that is relatively uncomplicated and inexpensive to manufacture, has a reduced weight, and packaging size, assures an even split of loads, and generates independent redundant load paths.

DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
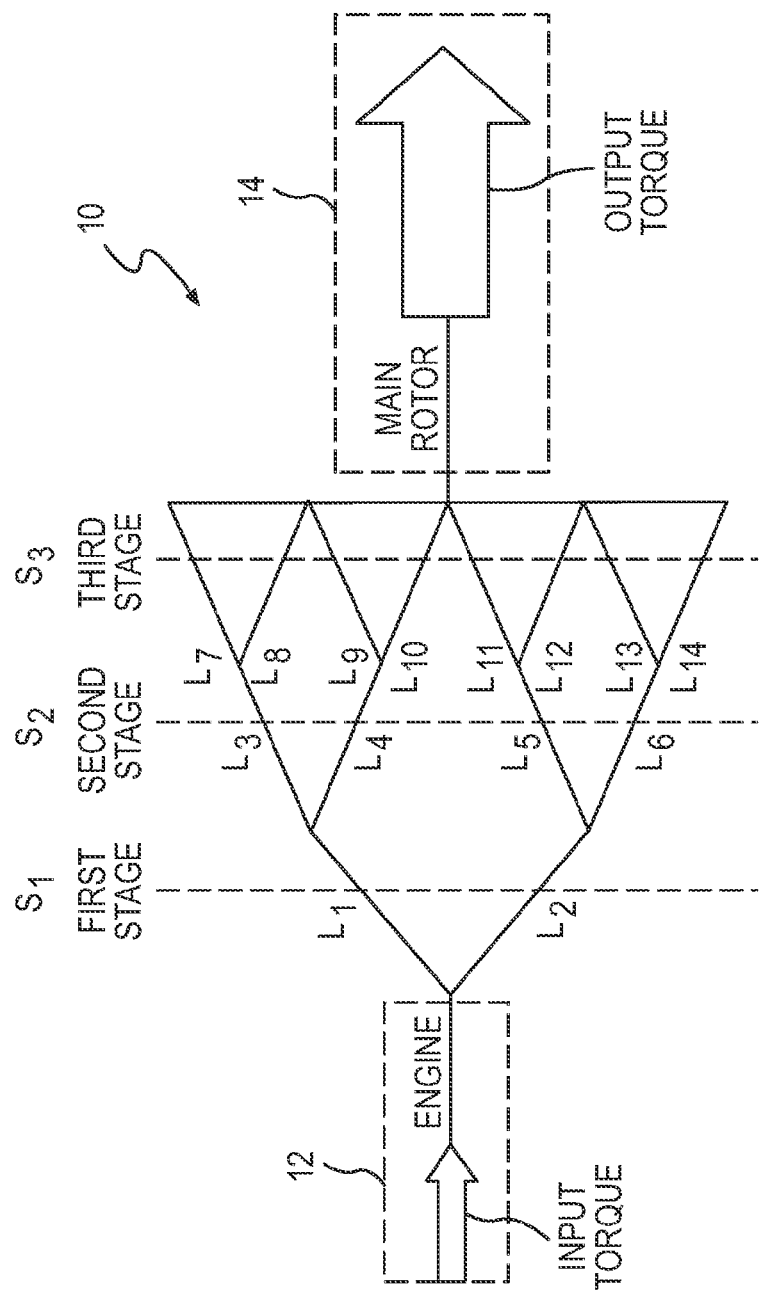
FIG. 1 is a general schematic view of an exemplary rotary wing aircraft embodiment for use with the a split torque gearbox system present invention.

FIG. 1 illustrates a general schematic view of a split torque gearbox system 10. In the case of a rotary wing aircraft transmission, the system 10 is interposed between one or more gas turbine engines (illustrated schematically at 12) and a rotor assembly (illustrated schematically at 14).

The split torque gearbox system 10 generally includes three stages $S_1$, $S_2$ and $S_3$. Each stage includes a plurality of links $L_1$-$L_N$. Each link represents gears which splits the torque from the engine 12. Each link is preferably structurally designed based on the transmitted portion of the total load for that link. That is, because of the equality of the load split, each link need not be over designed for a greater capacity as was heretofore required to assure transmission of an unequally split load.

Figure 2:
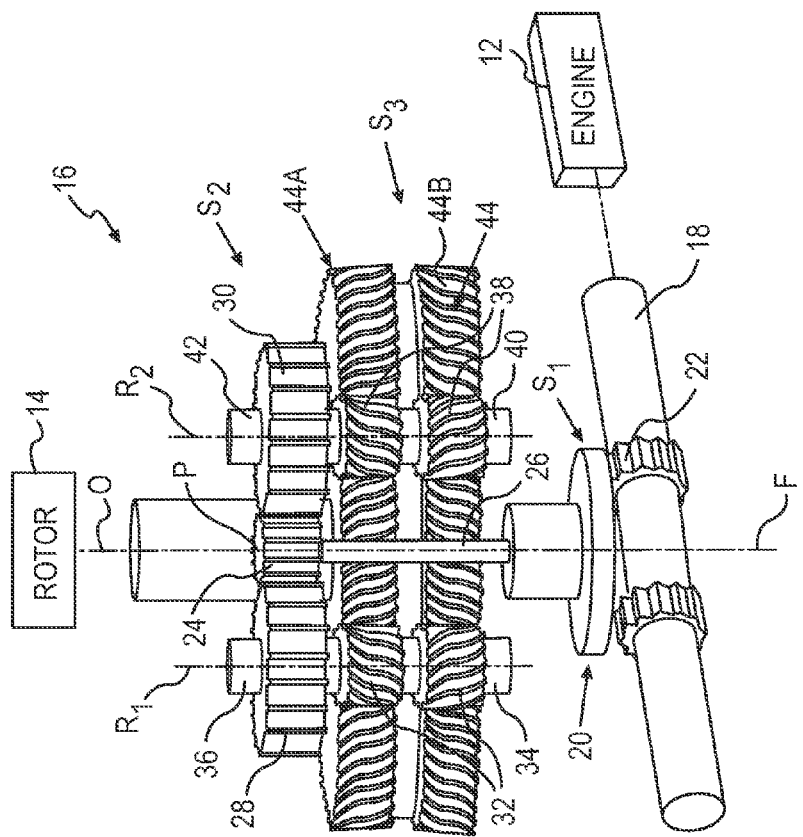
FIG. 2 is a perspective view of a split torque gearbox module according to the present invention.

Referring to FIG. 2, a split torque module 16 of the gearbox system 10 is illustrated. Each split torque module 16 generally includes the three stages $S_1$, $S_2$ and $S_3$. The split torque module 16 may be combined in various multiples so as to reduce the size of each module while providing a desired reduction in the rotational input velocity of one or more engine 12 inputs and a desired torque output to drive one or more rotor systems 14.

The split torque module 16 is driven by a high speed input shaft 18 preferably driven by the gas turbine engine 12. The input shaft 18 engages a face gear 20 at a first face gear mesh 22. The face gear 20 rotates about a face gear axis of rotation F. The face gear mesh 22 provides the first stage and is generally disk shaped and perpendicular to the axis of rotation F. It should be understood that other gear teeth arrangements such as a spiral bevel gear arrangement will also benefit from the present invention.

Figure 3:
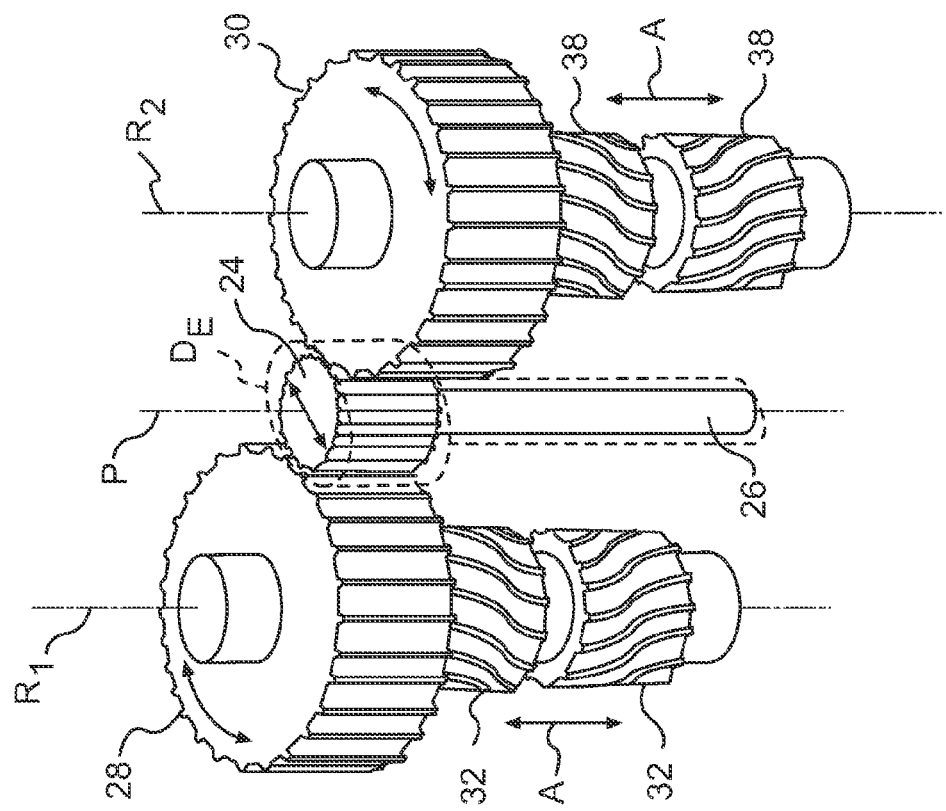
FIG. 3 is an expanded perspective view of a floating pinion gear designed according to the present invention.

The face gear 20, through a pinion shaft 26, drives a floating pinion 24. The pinion shaft 26 defines a pinion gear axis of rotation P which is displaceable off the face gear axis of rotation F (schematically illustrated in FIG. 3). Preferably, the pinion shaft 26 provides a flexibility which defines a pinion gear displacement envelope $D_E$ (FIG. 3). It should be understood that other non-rigid or unsupported mounting arrangements which provide displacement envelope $D_E$ will also benefit from the present invention.

Figure 4:
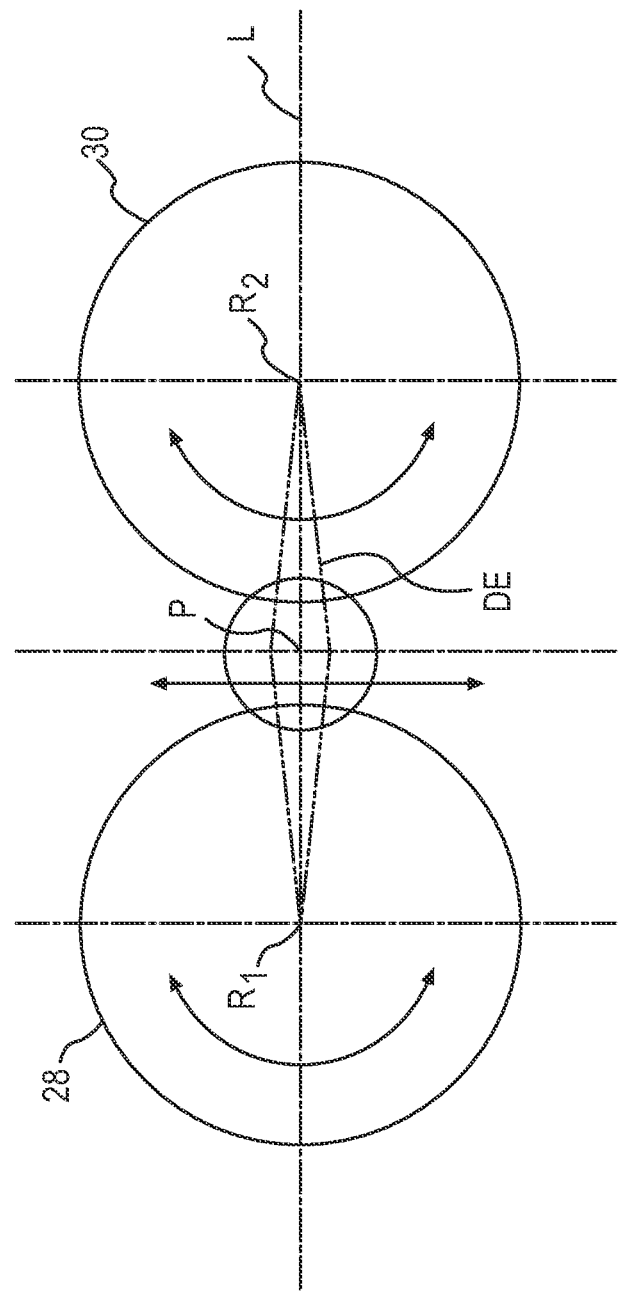
FIG. 4 is a schematic top view of a floating pinion gear.

At the second stage $S_2$, the floating pinion 24 engages a first spur gear 28 and a second spur gear 30. The first spur gear 28 rotates about a first spur fear axis of rotation $R_1$ and the second spur gear 30 rotates about a second spur gear axis of rotation $R_2$. The first spur gear axis of rotation $R_1$, the second spur gear axis of rotation $R_2$ and the pinion gear axis of rotation P are located along a common line L (FIG. 4). The pinion gear axis of rotation P, however, is displaceable off the face gear axis of rotation F and off the common line (FIG. 4) such that the load of the floating pinion 24 is effectively split between the first spur gear 28 and the second spur gear 30. The first spur gear 28 and the second spur gear 30 thereby receive an equal amount of torque.

A first double helical gear 32 is driven by the first spur gear 28 about the first spur gear axis of rotation $R_1$. Preferably, the first double helical gear 32 is connected to the first spur gear 28 through a first spur gear shaft 34 which rotates about the first spur gear axis of rotation $R_1$. The first spur gear shaft 34 is supported upon roller bearings 36 or the like.

A second double helical gear 38 is driven by the second spur gear 30 about the second spur gear axis of rotation $R_2$. Preferably, the second double helical gear 38 is connected to the second spur gear 30 through a second spur gear shaft 40 which rotates about the second spur gear axis of rotation $R_2$. The second spur gear shaft 40 is supported upon roller bearings 42 or the like.

Preferably, the first and second double helical gear 32, 38 are axially displaceable (schematically illustrated by arrows A) along shafts 34, 40 (FIG. 3) respectively. At a third stage $S_3$, the first and second double helical gear 32, 38 engage an output gear 44 which includes a double helical mesh for meshing engagement with the first and second double helical gear 32, 38. The first and second double helical gear 32, 38 drive the output gear 44 about an output axis of rotation O.

In order to provide a load sharing the double helical gears 32, 38 are free to move axially to provide instant contact with upper and lower helical mesh 44A, 44B of the output gear 44. Since the two spur gears 28, 30 are engaged with the floating pinion 24 it will travel to balance the loads coming from both gear meshes. For this reason, the gears 28, 30 of the second stage and the pinion 24 are located on the common line L.

As the first and second double helical gear 32, 38 are axially displaceable (arrows A), engagement between the first and second double helical gear 32, 38 and the output gear 44 provides effective load sharing and center seeking. That is, the meshing engagement of the double helical mesh will compensate for unequal load distribution by axial movement of the first and second double helical gear 32, 38 relative the output gear 44. Moreover, after movement of the first and second double helical gear 32, 38 out of axial central alignment with the output gear 44, the meshing engagement of the double helical mesh will drive the first and second double helical gear 32, 38 back toward the axial center.

The output gear 44 drives the rotor assembly 14 about output axis of rotation O. It should be understood that systems other than a rotor system will also benefit from the present invention. The inventive gear arrangement of the present invention is not limited to just prop rotor applications.

Figure 5:
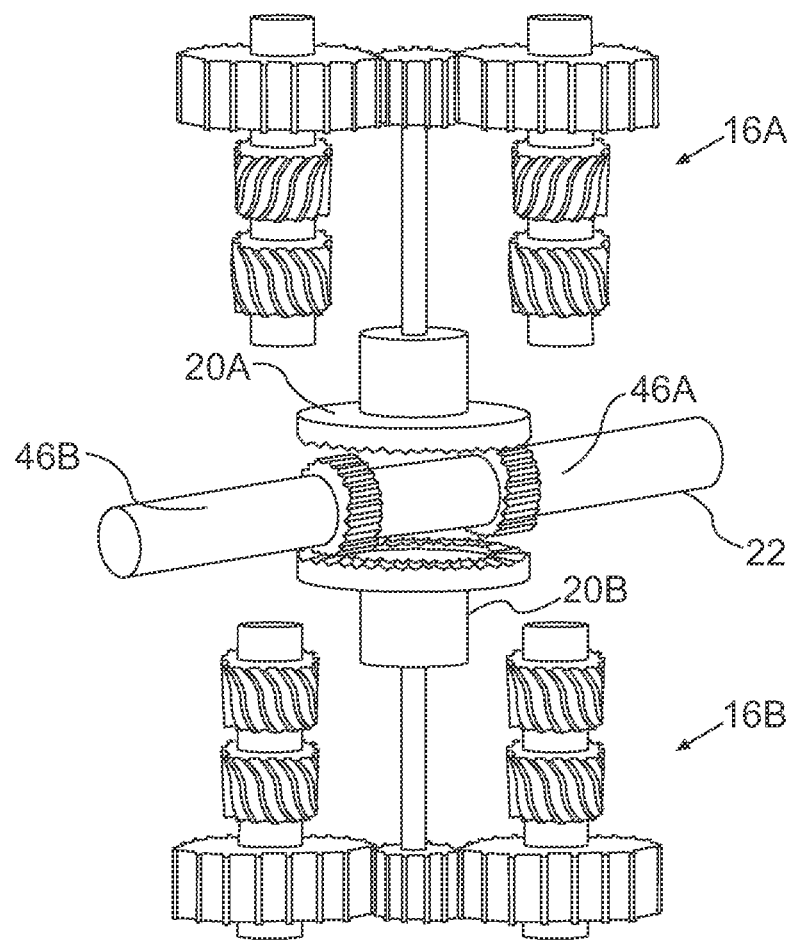
FIG. 5 is a perspective view of a multiple of split torque gearbox modules according to the present invention.
Figure 6A:
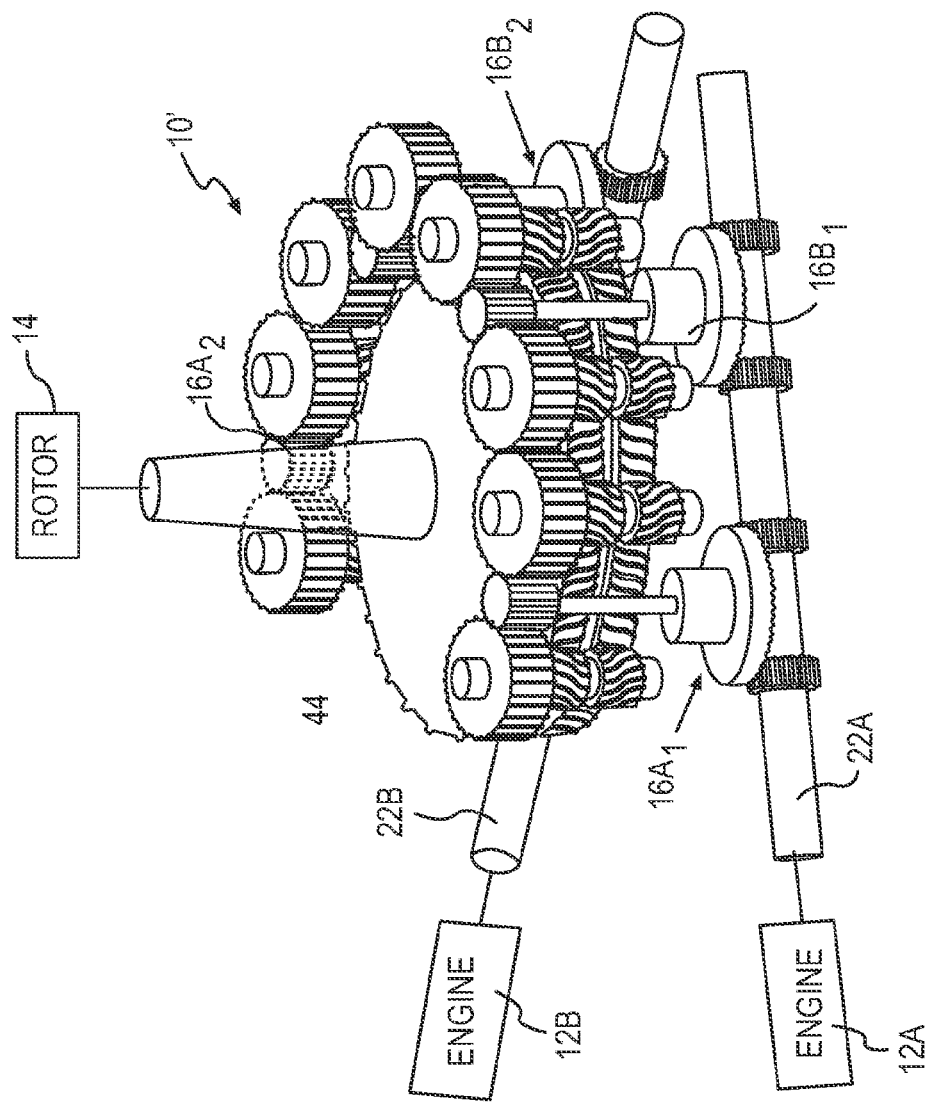
FIG. 6A is a perspective view of a split torque gearbox system according to the present invention.
Figure 6B:
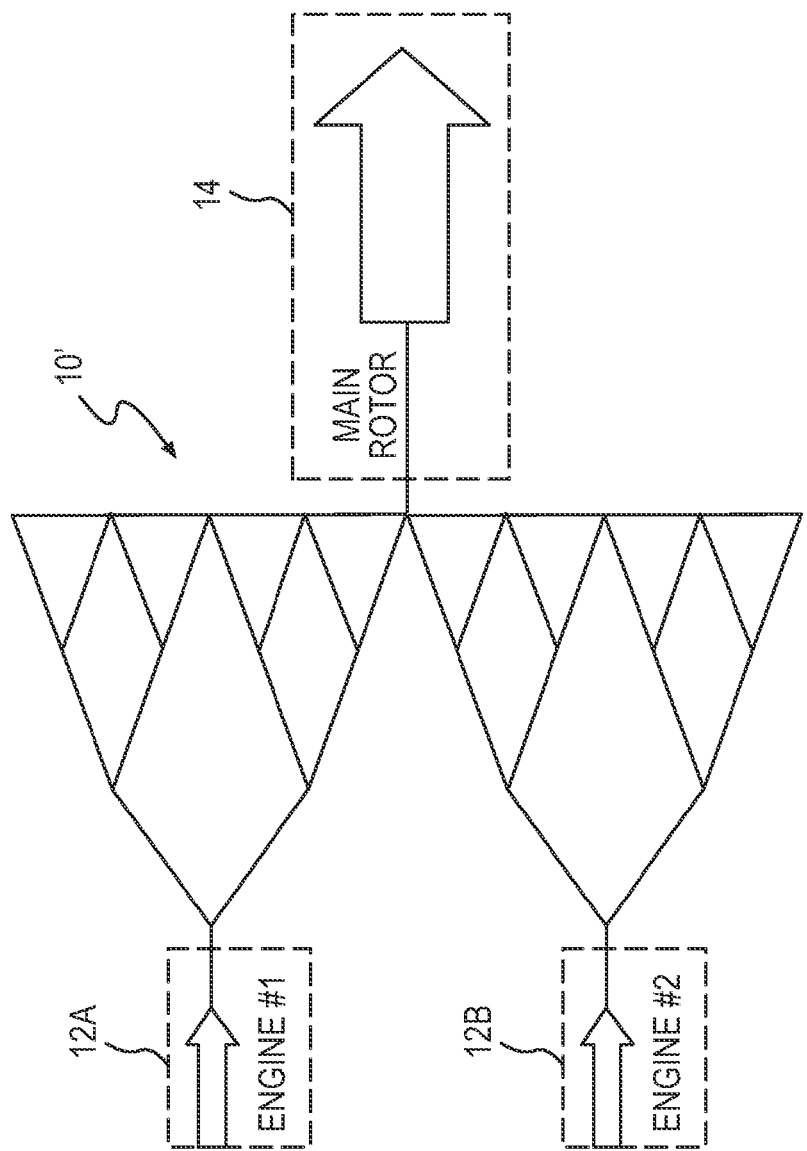
FIG. 6B is a general schematic view of the split torque gearbox system of FIG. 6A.

Referring to FIG. 5, a multiple of input shaft gears 46A, 46B are arranged along the input shaft 22 to engage a multiple of face gears 20A, 20B which drive a respective module 16A, 16B as described above. It should be understood that numerous combinations of modules will benefit from the present invention Referring to FIG. 6A, a multiple of engines 12A, 12B each drive a respective input shaft 22A, 22B such that a multiple of modules $16A_1$, $16B_1$, $16A_2$, $16B_2$ drive a common output gear 44. A relatively flat gear split torque gearbox system 10 is thereby provided which provides multiple load paths in which the failure of a single module will not fail the entire system 10" (FIG. 6B).

Figure 7:
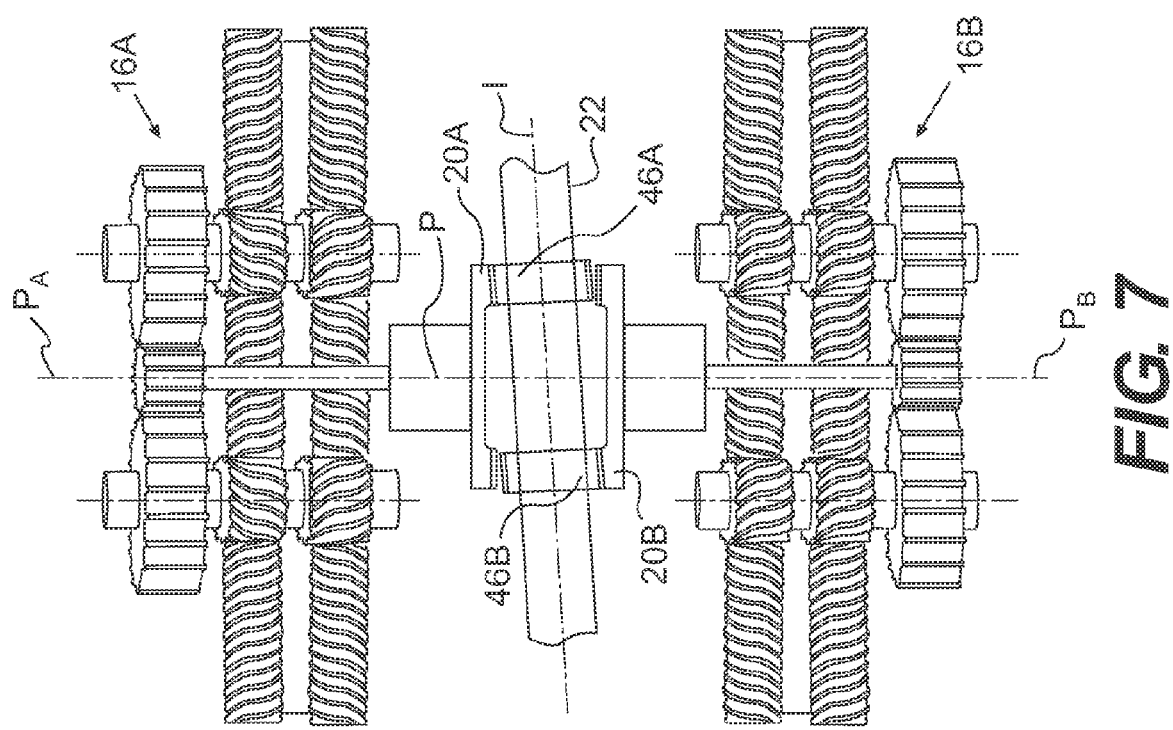
FIG. 7 is a schematic side view of a split torque gearbox system according to the present invention.

Referring to FIG. 7, the input shaft 22 is angled such that an input shaft axis of rotation I is non-perpendicular to the pinion shaft axis of rotation P to provide for stacking of the modules 16. The angled an input shaft axis of rotation I provides for engagement of each input shaft gear 46A, 46B with a respective face gear 20A, 20B. That is, the angle of the input shaft axis of rotation I provides a mesh between input shaft gear 46A and face gear 20A while providing a clearance between input shaft gear and face gear 20B. Likewise, the angle of the input shaft axis of rotation I provides a mesh between input shaft gear 46B and face gear 20B while providing a clearance between input shaft gear 46B and face gear 20A.

Figure 8:
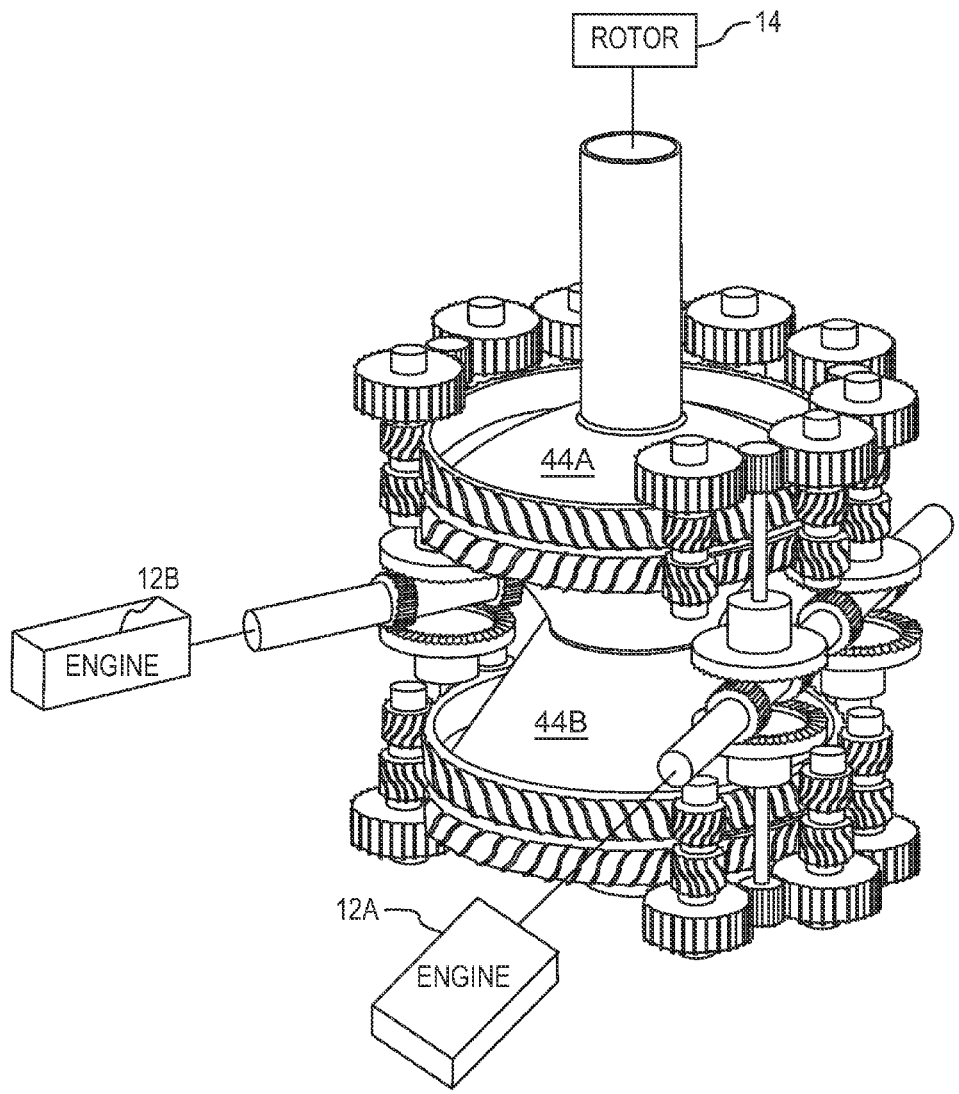
FIG. 8 is a perspective view of another split torque gearbox system according to the present invention.

Preferably, the pinion shaft axis of rotation $P_A$, $P_B$ of modules 16A, 16B are common. That is, modules 16A, 16A are stacked along a common pinion axis P. A multiple of stacked modules are readily achievable which drive a multiple of output gears 44A, 44B to drive a common rotor assembly 14 (FIG. 8). Double the modules of FIG. 6 (Eight modules) thereby drive a single rotor shaft assembly 14 with two engines 12A, 12B. Relatively smaller gears for the same output load may be provided in the FIG. 8 arrangement as each module carries half the load of each module in FIG. 6.

Figure 9:
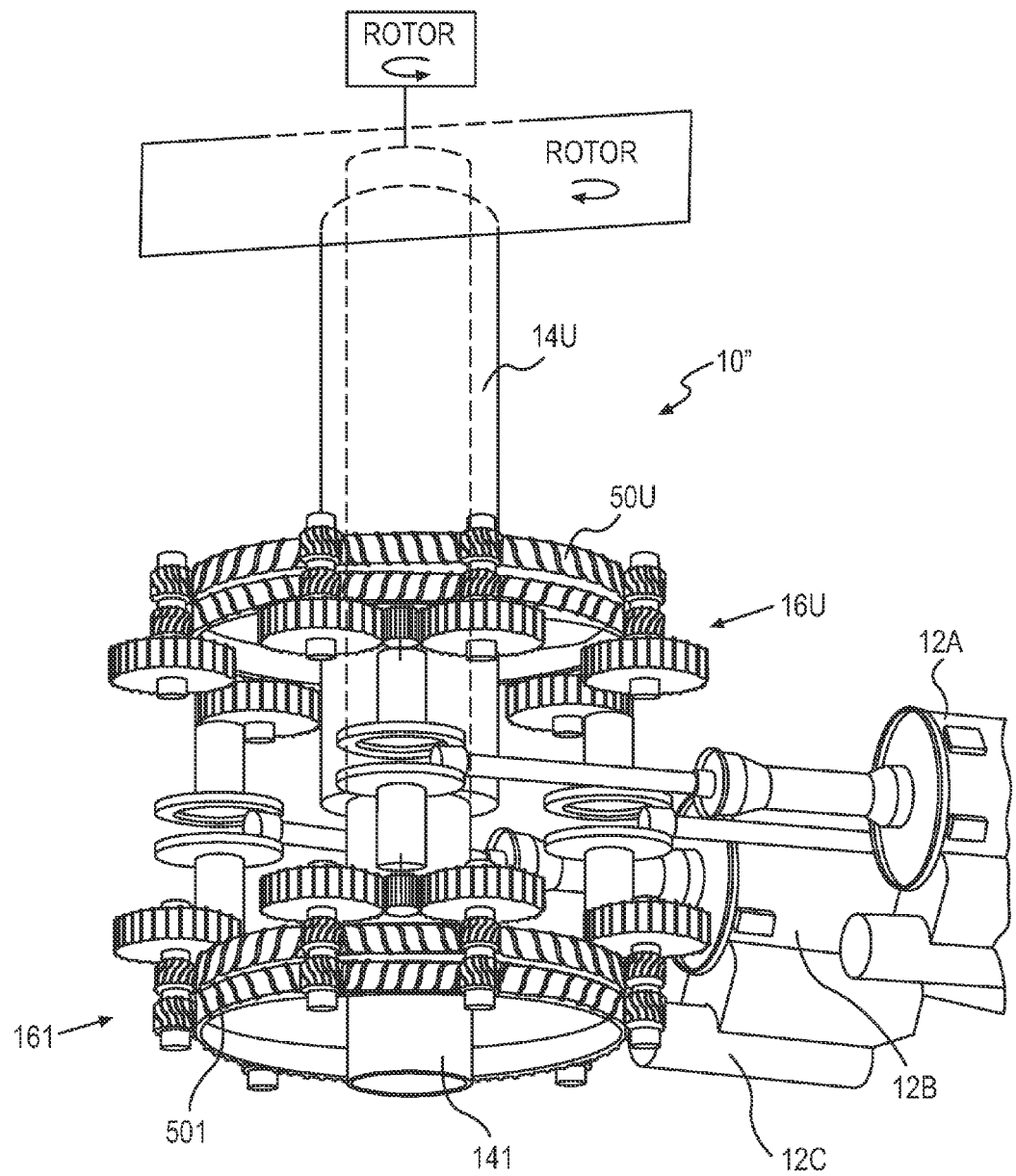
FIG. 9 is a perspective view of another split torque gearbox system according to the present invention.

Referring to FIG. 9, a system similar to the FIG. 6 system provides coaxial counter rotating system 10" with three engines 12A, 12B, and 12C. An upper set of modules 16U drives an upper output gear 50U and shaft 14U while a lower set of modules 16L drives a lower output gear 50L and shaft 14L. Shaft 14L is mounted within shaft 14U such that a coaxial counter rotating rotor system is provided.

The number of the Split Modules in the gearbox depends on aircraft configuration, number of engines and transmitted power. These modules are located around last stage output gear that combines power from each one and transmits it to the main rotor. The floating pinion, which is a part of the second stage of reduction, provides equal load balance between all gears engaged in the power train.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A split torque gearbox system for a rotary wing aircraft comprising:
   an input shaft including at least one input shaft gear arranged along the input shaft;
   two face gears driven by the at least one input shaft, the two face gears disposed on generally opposite sides of the input shaft;
   a first and second pair of spur gears; and
   two pinion gears driven by a respective one of the two face gears, each of the pinion gears connected to a respective one of the two face gears by way of a radially unsupported pinion shaft, each of the pinion gears engaging a respective one of the first and second pair of spur gears.

2. The split torque gearbox system as recited in claim 1, wherein the at least one input shaft gear includes two input shaft gears.

3. The split torque gearbox system as recited in claim 1, wherein said input shaft is driven by a gas turbine engine.

4. The split torque gearbox system as recited in claim 1, wherein the face gears each define a gear face perpendicular to an axis of rotation of the respective gear face, the input shaft angled relative to each gear face.

* * * * *